(12) United States Patent
Foote et al.

(10) Patent No.: US 7,836,207 B2
(45) Date of Patent: Nov. 16, 2010

(54) SYSTEM AND METHOD FOR REDIRECTING A WEBSITE UPON THE OCCURRENCE OF A DISASTER OR EMERGENCY EVENT

(75) Inventors: Kevin Avon Foote, Tuscaloosa, AL (US); Robert Allen Carr, Pinson, AL (US)

(73) Assignee: Fast Health Corporation, Tuscaloosa, AL (US)

( * ) Notice: Subject to any disclaimer, the term of this patent is extended or adjusted under 35 U.S.C. 154(b) by 502 days.

(21) Appl. No.: 11/961,686

(22) Filed: Dec. 20, 2007

(65) Prior Publication Data

US 2010/0031078 A1 Feb. 4, 2010

(51) Int. Cl.
*G06F 15/173* (2006.01)

(52) U.S. Cl. .................................................. 709/245

(58) Field of Classification Search ................ 709/245, 709/227
See application file for complete search history.

(56) References Cited

U.S. PATENT DOCUMENTS

| | | | | |
|---|---|---|---|---|
| 5,907,322 A | * | 5/1999 | Kelly et al. ................... | 725/51 |
| 7,010,293 B2 | * | 3/2006 | Go .......................... | 455/414.3 |
| 7,136,922 B2 | * | 11/2006 | Sundaram et al. ........... | 709/224 |
| 7,554,440 B2 | * | 6/2009 | Kadaba ................. | 340/539.22 |

* cited by examiner

*Primary Examiner*—David Y Eng
(74) *Attorney, Agent, or Firm*—Russell Carter Gache; Maynard Cooper & Gale, PC

(57) ABSTRACT

A system and method to deflect DNS inquires to a new IP address for a website prior to or after the occurrence of a natural disaster that damages the computer infrastructure of an organization, thereby interrupting the organization's ability to continue to offer its website information. An automated process is included that alters a zone file on a controlling DNS server in a manner that provides a minimum of disruption to resolver programs attempting to resolve names of deflected computers via Internet DNS. An intelligent monitor program continually, but periodically, surveys the organization's web server to confirm its operations status and intervenes in the DNS resolution structure for that web server in the event that a sustained disruption occurs.

25 Claims, 6 Drawing Sheets

SYSTEM AND METHOD FOR REDIRECTING A WEBSITE UPON THE OCCURRENCE OF A DISASTER OR EMERGENCY EVENT

FIELD OF THE INVENTION

The present invention relates generally to the Domain Name System ("DNS") as implemented on the Internet. In greater particularity, the present invention relates to the redirection of website addressing upon the occurrence of a specified event. In even greater particularity, the present invention relates to intelligent redirecting of website addressing using canonical name records.

BACKGROUND OF THE INVENTION

The Domain Name System ("DNS") associates various sorts of information with so-called "domain names" and provides for a user friendly addressing process for the Internet by translating human-readable computer hostnames into the IP addresses. This process is known as "name resolution" and may be handled in various ways, but the most common method is for name translations to occur through the DNS system (hereinafter "Internet DNS" or simply "DNS"). For example, the numerical address 66.230.200.100 is provided to Internet users' machines when the human readable address www.wikipedia.org is typed into an Internet browser addressing bar. The translation of a domain name or other human readable text into IP addresses provides the addressing scheme that networking equipment needs to deliver webpages to PCs around the world, and to provide other information such as addresses for mail exchange servers and other services available over the Internet. In providing a worldwide keyword-based addressing scheme (i.e. essentially a redirection service), DNS is a critical component for the functioning of today's Internet. The Internet is the medium through which most information is exchanged across the world.

While other computer programs exist that process name resolution requests from computer to computer, as of the filing of this application the most prevalent method for name resolution is dictated by the DNS process as invented by Paul Mockapetris in 1983 and governed by RFC ("Request for Comment") 1034 and 1035 as adopted by the Internet Engineering Task Force (IETF) in 1986. RFCs 1034 and 1035 made obsolete the prior RFCs 882, 883, 973 as adopted circa 1983-84. DNS is one of the original Internet standards, although new applications and extensions to DNS are continually being evaluated by IETF and the Internet community at large. The RFCs 1034 and 1035 specification is hereby incorporated by reference.

While the total scope and operation of DNS is not necessary for a complete understanding of the herein described invention, a few concepts are described below to facilitate in the description of the invention's preferred embodiments.

Name resolution in its simplest form is achieved by an ASCII text conversion table stored on each computer, traditionally know as a "HOSTS" file. At a local network level, a lookup table is maintained to list different machines that are added to the network and assigned numbers associated with each machine name through a program such as Windows DHCP program. The lookup table on a local network is updated only once for each new machine that is added (e.g. a new PC, a router, a printer, etc.) and is usually administered by a local DNS type program, such as the Microsoft Windows based program "WINS" (Windows Internet Name Service). Since HOST files are updated manually, and since even an automatically updated conversion file saved on a local machine would become impossibly large to accommodate all of the domain names used on the Internet, DNS changes this to delegate the lookup or resolution process across a distributed plane of name servers.

When an entity registers a human readable domain name (currently, letters and numbers and a few special symbols, but this is being expanded) with one of the dozens of ICANN authorized registrars (e.g. www.register.com), the registering entity specifies two DNS servers associated with a selected domain name, a primary and a backup DNS server. These servers are the authoritative sources for DNS information regarding the selected domain name and machines connected to a network on the domain. When a user of the Internet attempts contact a system in the network domain of the registered domain name, the machine utilized by the user will check progressively from its own DNS server's lookup table, to other machines connected thereto, to Internet core servers, and finally to the authoritative servers themselves to translate the spelled name into an IP address. This occurs through the action of a program in the DNS system called a "recursor" that sends and responds to addressing queries from other DNS servers in an iterative process. Currently, a popular UNIX based DNS resolution program that includes a recursor is BIND ("Berkeley Internet Name Domain"). Responses from these recursor programs usually are either error messages or a "pointer" to which the recursor program might send additional queries to find the host machine. Upon receiving a request, a DNS server contacted by a recursor program of another DNS server can respond in four ways:

1. It can answer the request with an IP address because it already knows the IP address for the domain.
2. It can contact another name server and try to find the IP address for the name requested. It may have to do this multiple times.
3. It can say, "I don't know the IP address for the domain you requested, but here's the IP address for a name server that knows more than 1 do."
4. It can return an error message because the requested domain name is invalid or does not exist.

This process is iteratively continued until a name is resolved and the host computer is contacted.

Once the resolution process is complete, in theory, various DNS server machines, and other intermediate name resolution machines, will propagate the human readable name's IP address association to their tables so that name resolution is facilitated across the Internet. Further, local DNS tables are configured to retain information (referred to as "caching") so that addresses used most often by its domain users are quickly accessible to facilitate the rapid functioning of DNS.

Very often, an ISP like "yahoo" or "Earthlink" will administer domain names and their associated webpages and resources for an entity. But, quite often, organizations will maintain their own domain name and resources. For example, "HowStuffWorks" a well known information Internet site maintains their own machines dedicated to their website, including administering their own DNS server. As published on their website, they have a primary server and a secondary, as such:

AUTH-NS1.HOWSTUFFWORKS.COM 209.116.69.78
AUTH-NS2.HOWSTUFFWORKS.COM 209.116.69.79

Their primary DNS is auth-ns1.howstuffworks.com and any changes they make to this site is automatically propagated to the listed secondary site, which is maintained not by them, but by their ISP.

HOWSTUFFWORKS uses the name server software BIND for their domain and they have a zone file (similar to the functioning of a HOST file, but formatted for DNS on their host DNS server having the following form:

| | | |
|---|---|---|
| @ | NS | auth-ns1.howstuffworks.com. |
| @ | NS | auth-ns2.howstuffworks.com. |
| @ | MX 10 | mail |
| mail | A | 209.170.137.42 |
| vip1 | A | 216.183.103.150 |
| www | CNAME | vip1 |

This is a typical zone file and has the following meaning. The first two lines point to the primary and secondary name servers. The next line is called the "MX record" which indicates the e-mail SMTP server. The next line indicates the machine that handles a request to mail.howstuffworks.com. The next line indicates to the IP address that will handle a request to oak.howstuffworks.com. The next line points to the IP address that will handle a request to howstuffworks.com (no host name). This last line is also know as the "A NAME" record which lists the primary computer IP address.

As seen in the information in the zone file, several physical computer machines at separate IP addresses make up the computer server infrastructure for the website www.howstuffworks.com.

One will also note that a "CNAME" record appears in the above zone file on the last line. CNAME is short for "canonical name," which is usually referred to as a CNAME record. A CNAME record in a DNS database, like the zone file above, is a record that indicates the true, or "canonical," host name of a computer with which its aliases are associated.

CNAME records can be used when a computer or service needs to be renamed to temporarily allow access through both the old and new name, or to point a sub-domain to another domain, or to have a sub-domain point to a computer outside of the host domain. In the above zone file example, the CNAME record redirects all world web entries http://www.howstuffworks.com to the vip1 server IP address listed under the A Name record. CNAMES are often used to redirect address bar mistakes entered into Internet browser software fields. For example, many HOST record files redirect incorrect entries like http://wwww.domainname.com and http://ww.domainname.com to http://www.domainname.com, which is helpful for instances when an Internet user do not enter the correct number of "w"s in the browser address bar of their Internet browser program like Internet Explorer. The complete usage and acceptable forms of CNAMEs may be found in RFC 1034.

However, while usage of CNAMES provides a flexible means for redirecting access to websites, domains, sub-domains, resource records, etc., the common method for altering the zone file or equivalent DNS record file is manual editing of the file. While some useful interfaces are available to make the process simpler, the action is consistent—alteration of the text in a text file.

However, when a website becomes inoperative because the server machines that hold the DNS record file no longer function, such as when a natural disaster damages computer equipment or denies power, cuts communication paths, or causes the loss of other critical computer support infrastructure, a lack of a DNS server response causes an error in the DNS system for that system. Alternatively, if a known IP address is retained from prior DNS resolution activities, but the computer server providing the resource record is not functioning, an error will be generated. Hence, without manual alteration of a DNS record file held by an alternative host computer, which will cause a delay in propagation of the revised DNS record of up to several days, a website made inoperative by a natural disaster would be inaccessible for several days or months, with restoration only occurring if the organization had the foresight to retain a backup of all prior information and has personal ready to quickly edit the appropriate DNS records to provide new IP addresses for the content. If the authoritative host machine was made by a natural disaster inoperative, which would not be uncommon for self-administered sites, the disruption could last for some time, and certainly a website held on a web server maintained by the entity would be inoperative during and just after the disaster event.

Hence, what is needed is a system for quickly and simply "deflecting" (e.g. re-routing) inquires to a website on the Internet upon the occurrence of a natural disaster or the immanent occurrence of a natural disaster so that information of an affected organization can safely maintained irrespective of the extent of the disaster to the organization's computer infrastructure. The implementation of this deflection process must cause a minimum of disruption to the resolution of the affected primary domain name of the organization through DNS so that access to the deflected website will not be inhibited.

SUMMARY OF THE INVENTION

In summary, the present invention provides a system and method to deflect DNS inquires to a new IP address for a website prior to or after the occurrence of a natural disaster that damages the computer infrastructure of an organization. This is achieved by automating the alteration of appropriate zone file records on a DNS server in a manner that provides a minimum of disruption to resolver programs attempting to resolve names of affected computers on the Internet.

DESCRIPTION OF THE PREFERRED EMBODIMENTS

Figure 1:
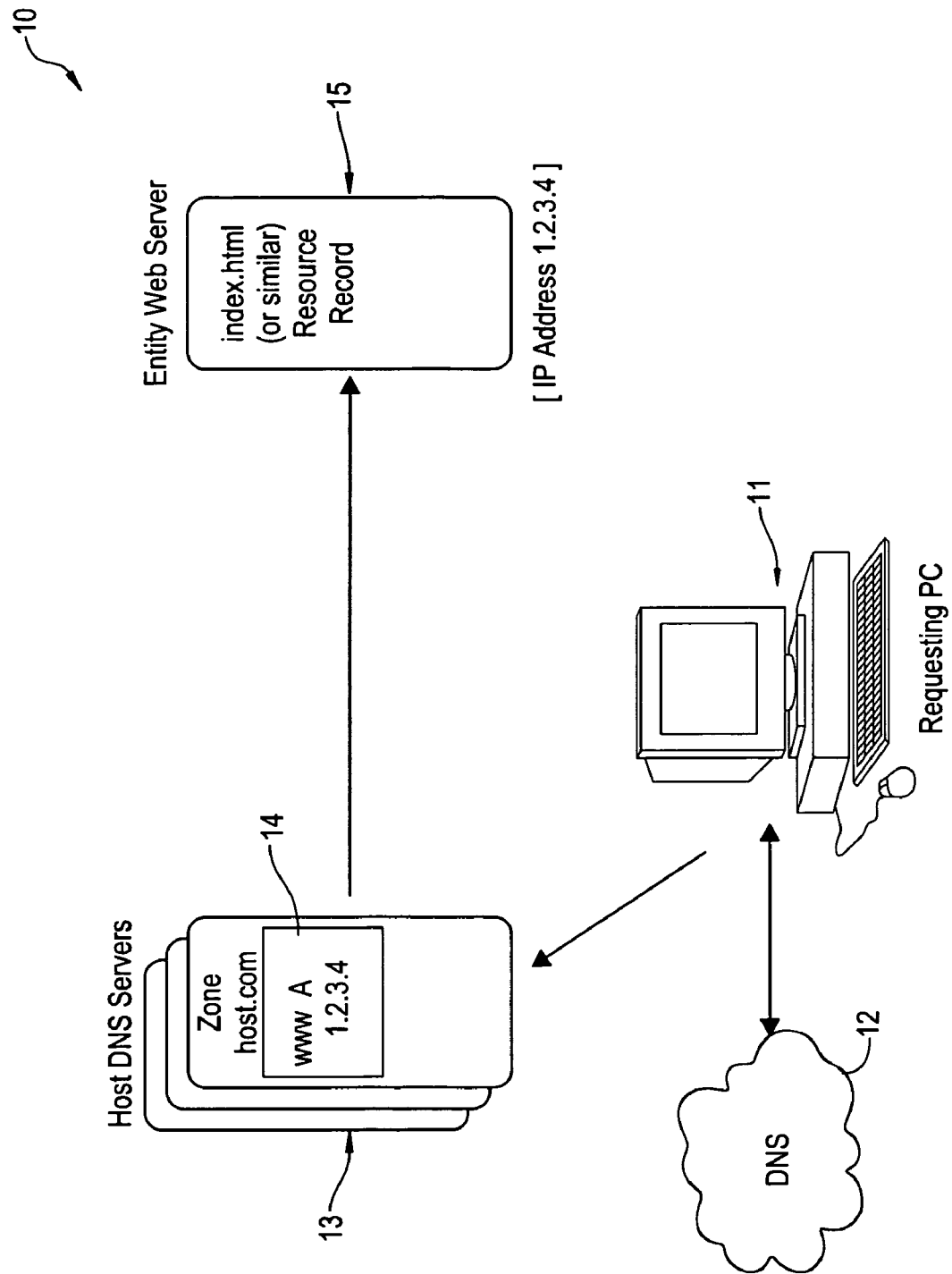
FIG. 1 is a block diagram showing a generalized view of Internet DNS and the requesting sequence from a PC for a nominal webpage request over the Internet.

Referring to the drawings for a better understanding of the function and structure of the invention, FIG. 1 shows a typical webpage request process 10 when requesting PC 11 attempts to resolve a human readable name associated with an Internet webpage utilizing the DNS system 12 over the Internet. A DNS software application running on server connected to the PC 11 supplies DNS name resolutions to the requesting PC 11 during the request. DNS 12 working in tandem with the DNS software application provides an Internet protocol ("IP") address enabling the requesting PC 11 to make a direct request for a resource present on a web server 15 via zone host DNS server 13. The zone host DNS server 13 includes the authoritative information about a resource located on the web server 15 in the form of a "zone file" 14. The zone file includes A records and CNAME records, as the case may be, and the IP address of the web server 15 is of the form 1.2.3.4 as shown.

In a nominal web server scenario in which the web server is controlled by an organization having the organization's website, an entity such as a large institution that owns its own host DNS server and web server are likely to be physically located at the physical institution or entity's location, and both may reside on a single server computer machine. Most large institutions or entities need guaranteed sustainability of their web server at all times, and access to the associated webpages residing thereon in order to satisfy their mission requirements for their clients, customers, and third parties relying upon the information found on the web server. However, upon the occurrence of a natural disaster, such as a large hurricane like Hurricane Katrina in 2005, the physical locations of the entity and the web server or a host computer server residing thereon may be compromised or even completely destroyed. In those situations in which a catastrophic system failure occurs, requesting PC 11 will be unable to obtain the necessary information residing on the entity web server until a rebuilding of a web server may be accomplished and power and system infrastructure restored to provide the information. The present system provides a system and method for monitoring and redirecting (i.e. "deflecting") a website inquiry to maintain continuous availability of the entity web server in the event of a catastrophic failure to the institution or entity's computer systems or supporting infrastructure.

Figure 2:
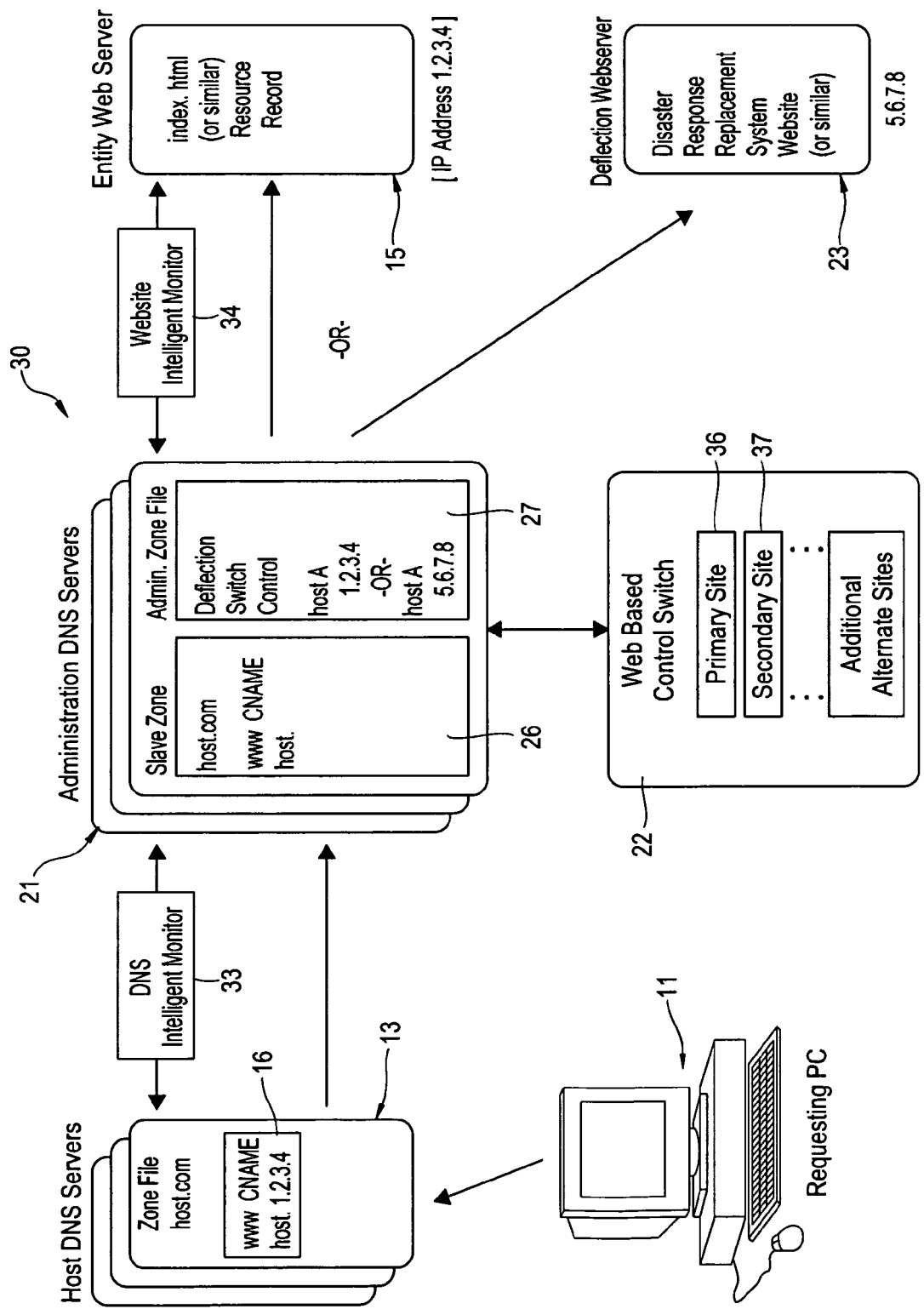
FIG. 2 is a system block diagram of the invention affecting the logical DNS associations to achieve a webpage deflection.

Referring now to FIG. 2 it may be seen that intervening administration DNS server(s) 21 is positioned within the DNS resolution topology to allow for monitoring and control of web service to entity web server 15 to accomplish automatic 34 deflection of the website inquiry. The system 30 includes an administration DNS server(s) 21 which monitors and controls the content of zone file 27 such that upon the occurrence of an automatic state change (i.e. deflection to a pre-specified site) the appropriate zone file is edited and published. Such a state change request may be initiated via the web 22 in which various state site changes 36-37 may be requested. CNAME record 16 is inserted into zone file residing on host DNS server 13 as shown, and will be propagated through various DNS servers associated with providing authoritative information for the entity web server 15.

Upon the editing and publication of the zone file 27, the DNS system propagates the information such that new inquiries for a resource residing on entity web server 15 are now redirected to web server 23 having an IP address of the form of 5.6.7.8. The resource occurring on web server 23 likely contains emergency information, other vital information pertinent to the disaster, the status of the institution's physical location, and the deflection state of the website may be selectively timed such that information may be provided before, during, and after the occurrence of the disaster. The deflection request may also be automatically initiated by a website intelligent monitor program 34, as will be shown.

Prior to initiation of the deflection process via the herein described system 30, a CNAME record 16 is created in the DNS zone file present on the host DNS server 13. The CNAME record points to or "canonizes" the IP address of the human readable domain name for the entity web server 15 to an A record 27 located on the administration DNS server that will control the deflection process. Since the CNAME record present on zone file 16 points to the administration DNS server 21 as an A record, zone file 27 may be edited on demand to change the IP address associated with the corresponding A record such that deflection will occur upon the publication and proper refreshing of associated DNS servers with the zone file 27. In other words, web server A record (e.g., IP address 1.2.3.4) may be edited such that the A record of file 27 points to a different IP address (i.e., 5.6.7.8). With A record associated with IP address 1.2.3.4, the interaction of zone file 16 with zone file 27 does not alter the DNS resolution to a web resource, such as index.html or similar record located on entity web server 15. But, the alteration of A record in file 27 to 5.6.7.8 causes a deflection to web server 23 thereby establishing upon demand a potential disaster response site available to supply information normally available on entity web server 15. Obviously, as already known in the art, all the information on entity web server 15 may be replicated or mirrored on web server 23 prior to the initiation of a deflection in order to maintain all the content previously available on entity web server 15. Other editing of key index files on web server 23 may establish whatever important messages are necessary for a disaster response system to properly present timely information pertaining to the institution disaster or infrastructure damage.

The web based switch control 22 allows for the remote initiation of a deflection to web server 23 upon the collection of a primary 36, secondary 37, or additional alternate sites to which entity web server 15 should be deflected. As shown below, the website intelligent monitor 34 monitors in real-time the entity web server 15 status in such a manner as to implement the deflection automatically upon the occurrence of a suspension or prolonged interruption of services provided by entity web server 15.

The entire process is complicated by the expiration (i.e. the "expiry") of the administration DNS server 21's authorization to transmit data about server 13, and therefore the efficacy of zone file 27 in the event that server(s) 13 are destroyed and they can no longer issue a proper refresh command under the re-curser protocols for DNS is limited. Hence, it is important that a sufficient length of time (i.e. the expiry must be sufficiently large) such that the required refresh time would not occlude the time of destruction during which server 21 would lose it authorization.

Figure 3:
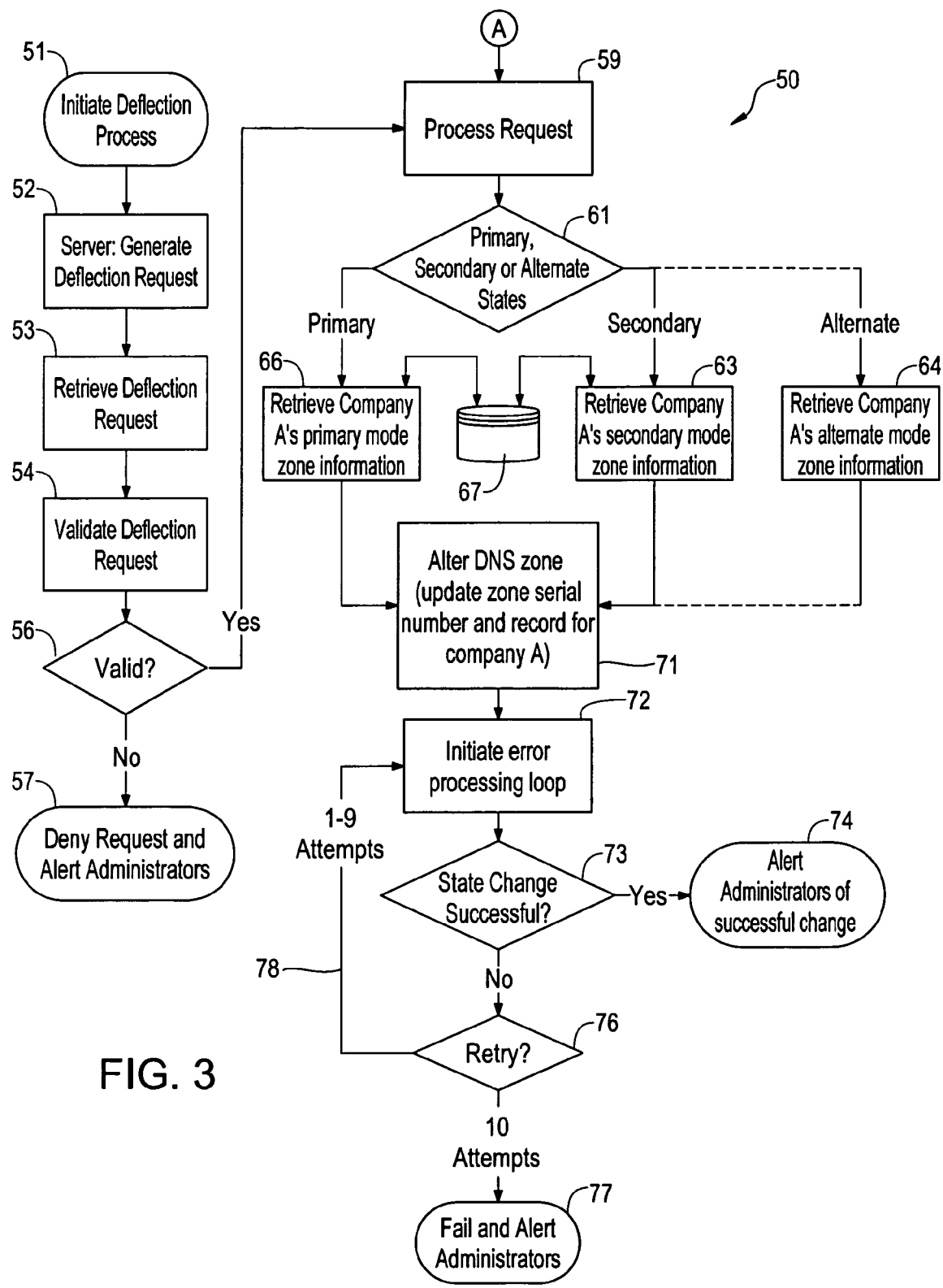
FIG. 3 is a process flow diagram showing the primary steps associated with the invention.

Referring now to FIG. 3, initiation of the deflection process 50 is typically started with a web based form retrieved from server 21 and a user selecting one of a number of deflection states 36-37 as may be desired on an html presented screen. The screen serves as a control switch 22 to select different sites, but each of these sites may also be interpreted as a particular "state" in the deflection process because, within the parameters of a particular disaster encounter, there are usually a before state, a during state, and after states that represent the institution's desire to communicate status and other information pertaining to the entity's condition and the availability of its data via the web. Hence, multiple states may be established for deflection purposes with each state associated with a time or other type of parameter which may be selected or switched on via web base control. The web based control or form 22 typically resides on the administration server 21, but may reside anywhere that has effective communication with the administration server 21. For example, the person with a notebook computer may be able to access, assuming the correct passwords are provided, the deflection switch 22 from any location on the planet, including the institution or entity's primary physical location. The inventor's anticipate that various types of self-explanatory selection criteria and boxes may be presented to a user desiring to deflect their current site, but for the purposes of the herein described invention the actual form style associated with the various states is unimportant for a complete understanding of the invention.

Upon the selection of a deflection state via a web form, a file is written on the administration DNS server 21 at a known directory location (e.g. drop-off) which initiates 51 the generation of a deflection request 52. The server checks periodically in the drop-off directory to see if a file or multiple files are present. It then processes 53 the files in the order of creation, oldest first. Each file that is written to the drop-off directory includes a known set of information to allow for error detection and validation of the file creation. The information that is contained in the file is also written into a database on the server created. For example, the information in the file may be written to a database backend such as MY SQL. The actual creation of the file and entry into the appropriate database is effected by a "post" command via the HTTP protocol from the originally presented webform 22. Data in the file created by the administration DNS server 21 has the format shown below in Table 1.0.

TABLE 1.0

Sample Deflection Request File

14:1:FastCommand
AZIYYZQXT5N1Q723FHI5LQJMJGQO3FH34QSSF8GZ4UQL-
RJFWQNR241FE7VS00ZTVGCDMBKB54RHL1M
7IZPAUGFYE1G4S6ODCRHOS TABLE 1.0-continued Sample Deflection Request File 40cfb99c5084cafcafd0f9d62196bd8e The request file includes information which is pre-populated by information already present in the database file on the server and associated with the user's identification and selection action. The first line of the deflection request file includes, separated by colons, a request ID "14," client ID "1", and the state to which the user wishes to deflect his current website to. The second line comprises a unique identification string to allow for the execution of a checksum validation and for database correspondence verification once the data in the deflection request file is written to the database. The next line is left blank simply for syntax and file protocol verification and does not consist of any viable data. The last line is a validation string to allow for one-way encryption and of the deflection request file. The syntax of any deflection request file may vary depending upon the desired parameters to be received and interpreted by a deflection database, however the inventors have found that this format is simple and ensures integrity of request reception with a minimum of errors or unauthorized intrusions. In table format, the meaning of each line in the request file has the syntax shown in Table 2.0. Deflection Request File Syntax

TABLE 2.0

Deflection Request File Syntax

<ReqID>:<ClientID>:<FC State>
<Request Validation String>
<blank>
<Host Validation String>

The data structure in a MY SQL database does not have an obligatory format, however the inventors have found that the format of the database as shown in Tables 3.0 and 4.0 are helpful in the validation process for each user deflection request. The tables 3.0 and 4.0 below correspond to the file creation structure which correlates with the deflection request action.

TABLE 3.0

```
| 51 |   59 | efc15c539645d954a581acbc3f5753ab |   0 | 63.146.226.114 | 12.150.248.39 | 1 |
| 52 |   60 | 87b31f7cf1b506abb4ec1c06e386e526 |   0 | 12.166.66.102  | 12.150.248.39 | 1 |
```

Deflection Database Request Sample

TABLE 4.0

```
| id | clientID | reqstate    | signature
| host                        | oldIP           | timestamper         | chksum |
| 59 |       11 | FastCommand |
916MSDQ5KLTT408Z4RVJP0OKZMF4ARU9JQM1T2X4EHO97MZ14KAJAPU02ZV3HF2QWFIG75ACDOCA112VC35DJP3BFO4MUX3G2BN0 |
www.methodisthospital.net    | 63.146.226.114  | 2007-11-14 11:51:54 | NULL   |
| 60 |       11 | normal      |
GK71JF74DV51P0HKU88JWUXD49F8PZMW9JNJPKDT69KLZSWJQVTCGHGAGM9WBLIBVVKB6OU2N4ECN1M3N66TDDUJPT6R5ESR03SX |
www.methodisthospital.net    | 12.166.66.102   | 2007-11-16 13:31:12 | NULL   |
```

Returning now to FIG. 3, the deflection request file retrieved during step 53 is validated 54 to confirm an authentic deflection request. Validation may be achieved in various ways as is known in the art, however the inventors for the present system utilize a numerical matching strategy to validate both database entry and the integrity of data in the deflection request based upon the confirmation of known data appearing on line 4 of the deflection request file. The control of the post back of information being written into a file directory on the server and the information contained in the file being written into MY SQL database is controlled by a PHP program running on the server (see FIG. 5, top portion). Typically, the server attempts to retrieve a request file every few minutes or during a pre-selected interval, and to the extent that the directory is empty the system understands that a validation request is not present and takes no action. However, upon the occurrence of any file in the pre-selected drop-off directory then a deflection request initiates processing of that file, and after being stored in the database as discussed above, is deleted from the drop-off directory. In the event that the drop-off directory includes multiple files, all the files are picked up and processed, and then deleted from the directory. Each deflection request is processed sequentially in chronological order in conformance with the file's creation date.

The deflection request file is then validated 54 by comparing the validation text string in the file with a text string present in the database on the server. Since the validation string in the database provides one of the inputs directly into the file creation, a validation that the file has come from the server 21 may be made. Essentially the validation process matches the validation request ID to confirm that the request strings match. Further, since the user is authenticated prior to being able to access the deflection webform, some information is already associated with the user and can also be written into the SQL database as well. However as it will be seen later, a validation request may come from other than a human user who which present a user ID and password. In the event that the validation process fails 56 a denial request message, logged in the database, and the administrators are alerted 57. If the validation request is validated, the deflection request begins to be processed further 59.

Initially, a particular state to which a deflection request applies is determined 61. For example, if the undeflected website is being changed to a first or primary deflection state, information pertinent to the primary state 66 is retrieved. Alternatively, secondary 63 or alternate 64 states are determined. As may be understood, an infinite amount of states may be retrieved and processed in order to provide a flexible state change methodology to the entity requesting deflections. So, for example, and as discussed previously, in the event of disaster, different deflections might be invoked associated with different website states to provide pre, during, and post disaster information for the entity that wishes to communicate its status. Hence, primary, secondary, and additional alternate states may be invoked via a deflection request process at a time of choosing of the deflecting entity.

Figure 4:
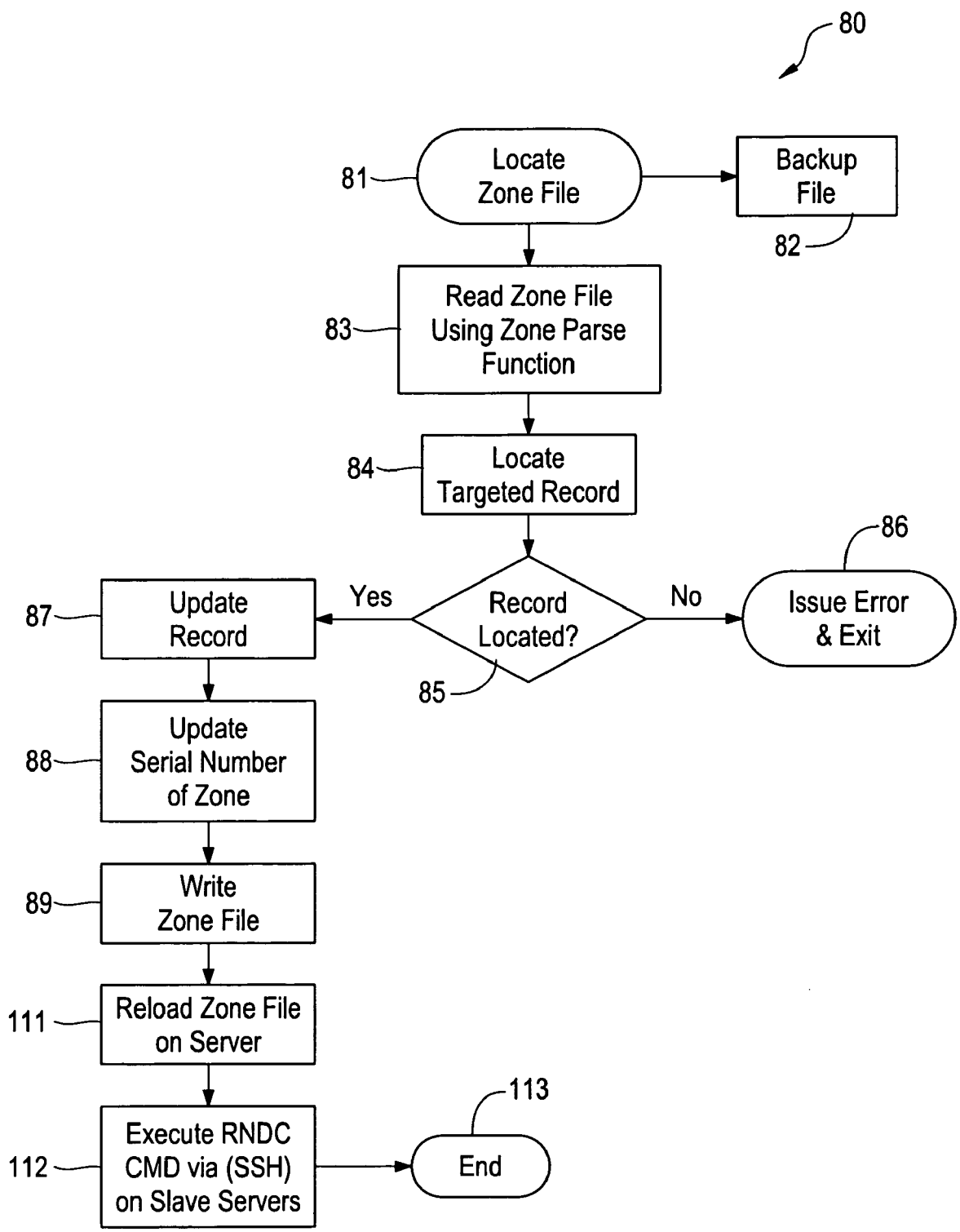
FIG. 4 is an expanded view of the zone file alteration step 71 of FIG. 3.

The associated information for primary, secondary or alternate, states are stored within database 67 and retrieved for further processing in block 71. Block 71 implements the process request by altering the DNS zone file 27 and publishing the zone file to the Internet DNS system. In particular, the A record associated with or corresponding to the CNAME record resident on the entity's DNS server 16 effects a CNAME deflection to the alternate website state. The implementation of the alterations to the DNS zone file in step 71 is accomplished as indicated in FIG. 4, and are written in PERL and/or BASH program scripts an example of which is shown in Table 5.0 below.

TABLE 5.0

Directory and File Structure Tree Located on DNS Server

|-- backups/
| |-- fastcommand.com.hosts.107101414242
| |-- fastcommand.com.hosts.107101414302
| |...
| '-- fastcommand.com.hosts.107612212948
|-- clients/
| '-- generate_sample_request.php TABLE 5.0-continued Directory and File Structure Tree Located on DNS Server

|-- error/
|-- logs/
| '-- cron.log
|-- pickup/
|-- processed/
| |-- 14.txt
| |-- 58.txt
| |...
| '-- 60.txt
|-- retry/
|-- scripts/
| |-- check_single.pl
| |-- cron.bash
| |-- defaults.bash
| |-- get_new.bash
| |-- process_new.bash
| |-- process_single.pl
| |-- update_zone.pl
| '-- writeLog.pl
|-- zones/ -> <link to dns zone files>
'-- zones_main/ -> <link to dns zone files>
Cron Entry
0,3,6,9,12,15,18,21,24,27,30,33,36,39,42,45,48,51,54,57 * * * */
home/fastcommand/scripts/cron.bash
2>&1 >> /home/fastcommand/logs/cron.log
Standard out and standard error are redirected to the cron.log file in order to log all output of the cron.bash command.

As shown in FIG. 4, initially the zone file on the server computer 21 is located 81 and backed up 82. Once the zone file is read into a memory array and a parse function in PERL is invoked 83. Upon the reading of the zone file the information in the zone file is read into a memory array. Once the information is read into the memory array the targeted record which corresponds with the CNAME record associated with the deflection requesting entity, is located within a listing of all of the A records held by the memory array 84. Once the record is located, an update to the record proceeds 87. However if the record is not located 85, an error is issued and the deflection process is terminated 86. The updating of the record 87 consists of altering the listed IP address to correspond with the IP address of the website corresponding to the selected state in the deflection request as recorded in the database. The serial number of the zone file is then updated 88 to correspond with the date and time change associated with the deflection request, thereby creating a unique serial number associated with each update to the zone file in response to a deflection request. The memory array holding the zone file is then written to the server hard drive 89, and a reload command 111 executed to the administration DNS server 21 as it applies to the zone file. An RNDC command is then executed 112 via SSH for all slave servers 26 associated with administration DNS servers 21.

It is critical that the Time To Live ("TTL") of the zone file be set to a relatively small value on server 21 so that any changes to the zone file are propagated through the Internet DNS system quickly. This increases DNS traffic to the server 21, when other servers who might contact the deflected entity web server, however this promotes a rapid publication of the revised deflection IP address to prevent any transient unreachable states for the web server during a disaster deflection implementation.

Figure 5:
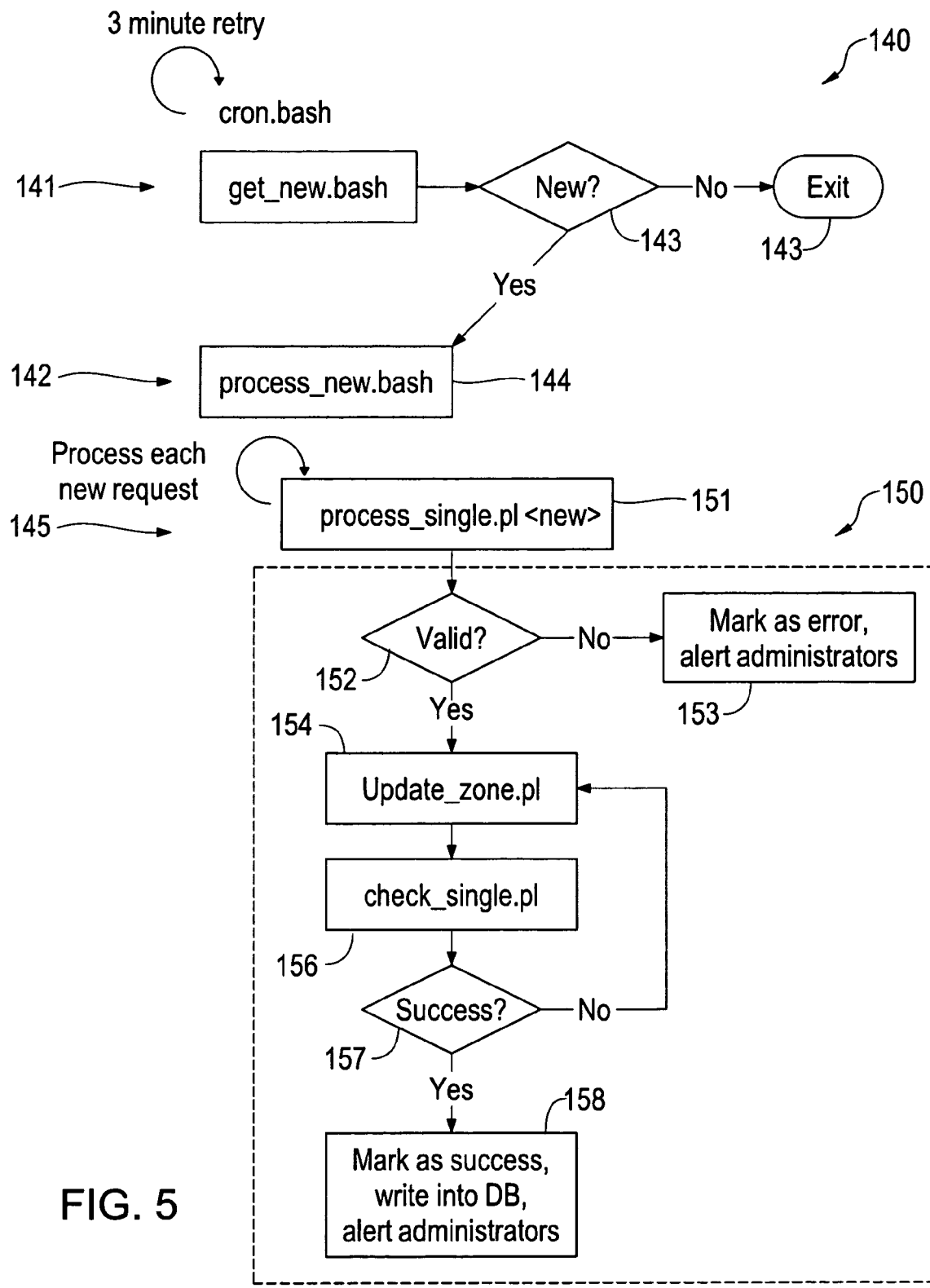
FIG. 5 is a top level scripting function map of the process steps shown in FIGS. 3 & 4; and, FIG. 6 is a process flow diagram showing the steps associated with website intelligent monitoring subsystem of block 34 in FIG. 2.

Referring again to FIG. 3, after the zone file is updated in step 71, an error processing loop is initiated 72 to confirm that the zone file DNS changes have been implemented. Net DNS resolver commands are initiated to all of the servers under the authority of the server 21. Each server is queried using recursor queries and the response from the other servers is compared with the IP address now recorded in the altered A in the zone file 27. It should be the same. In the event that the query is successful 73, a three digit code is returned and the loop processing program interprets the code to as a failed or successful state change and the server identified that responded through a three bit identifier. If the state change is successful the administrators are alerted of the successful change 74 for that particular server, but if the state change is unsuccessful then a retry 76 is initiated and looped for a maximum of ten (10) attempts 78. If ten attempts are unsuccessful in confirming a correct state change, then a failed deflection and alert is sent to the administrator 77. It should be noted that should these error initiation attempts are sent to known IP addresses since all of the server IP addresses are known and the queries are sent directly to each server in succession. In other words, the DNS system outside of zone of the administration servers 21 is not queried. Since the current procedures incorporate a three bit interpretation, the determination of up to three servers might be interpreted as to whether or not any or all of the changes were successful and any at the server level for the servers within the zone of authority for servers 21. Additional bits may be incorporated to address additional servers within the zone of authority for servers 21. A top level, envelope scripting representation for the processes shown in FIGS. 3 & 4 are shown in FIG. 5 to assist in script replication. The actual PERL programming steps may be found under Table 6.0 below.

TABLE 6.0

```
#!/usr/bin/perl
Return Index

# $return{"status"}

$fc[0] = "000; All Good";
$fc[1] = "001; NS1 Failed";
$fc[2] = "010; NS2 Failed";
$fc[3] = "011; NS1 & NS2 Failed";
$fc[4] = "100; NS4 Failed";
$fc[5] = "101; NS1 & NS4 Failed";
$fc[6] = "110; NS2 & NS4 Failed";
$fc[7] = "111; NS1, NS2, & NS4 Failed";

use Net::DNS;
$home = "/home/fastcommand";
$scripts = "$home/scripts";
do "$scripts/writeLog.pl";
$hostname=$ARGV[0];
$expectedip=$ARGV[1];
use Net::DNS;
my @myNameservers = ("12.150.248.34", "12.150.248.35",
"12.150.248.45");
$temp_status_code = 1;
$status_code = 0;
foreach $server(@myNameservers) {
    my $res = Net::DNS::Resolver->new;
    $res->nameservers($server);
    my $query = $res->search($hostname);
    if ($query) {
        foreach my $rr ($query->answer) {
            next unless $rr->type eq "A";
            #print $rr->address, "\n";
            $check_hash{$server} = $rr->address;
            #print "$server ==> $check_hash{$server}\n";
            if ( $check_hash{$server} eq $expectedip ) {
                #print "Good Change\n";
            } else {
                #print "Bad Change on $server,
                got $check_hash{$server}\n";
                $status_code += $temp_status_code;
            }
        }
    }
```

TABLE 6.0-continued

```
    } else {
        warn "query failed: ", $res->errorstring, "\n";
        $status_code += $temp_status_code;
    }
    $temp_status_code *= 2;
}
print "$status_code\n";
```

Figure 6:
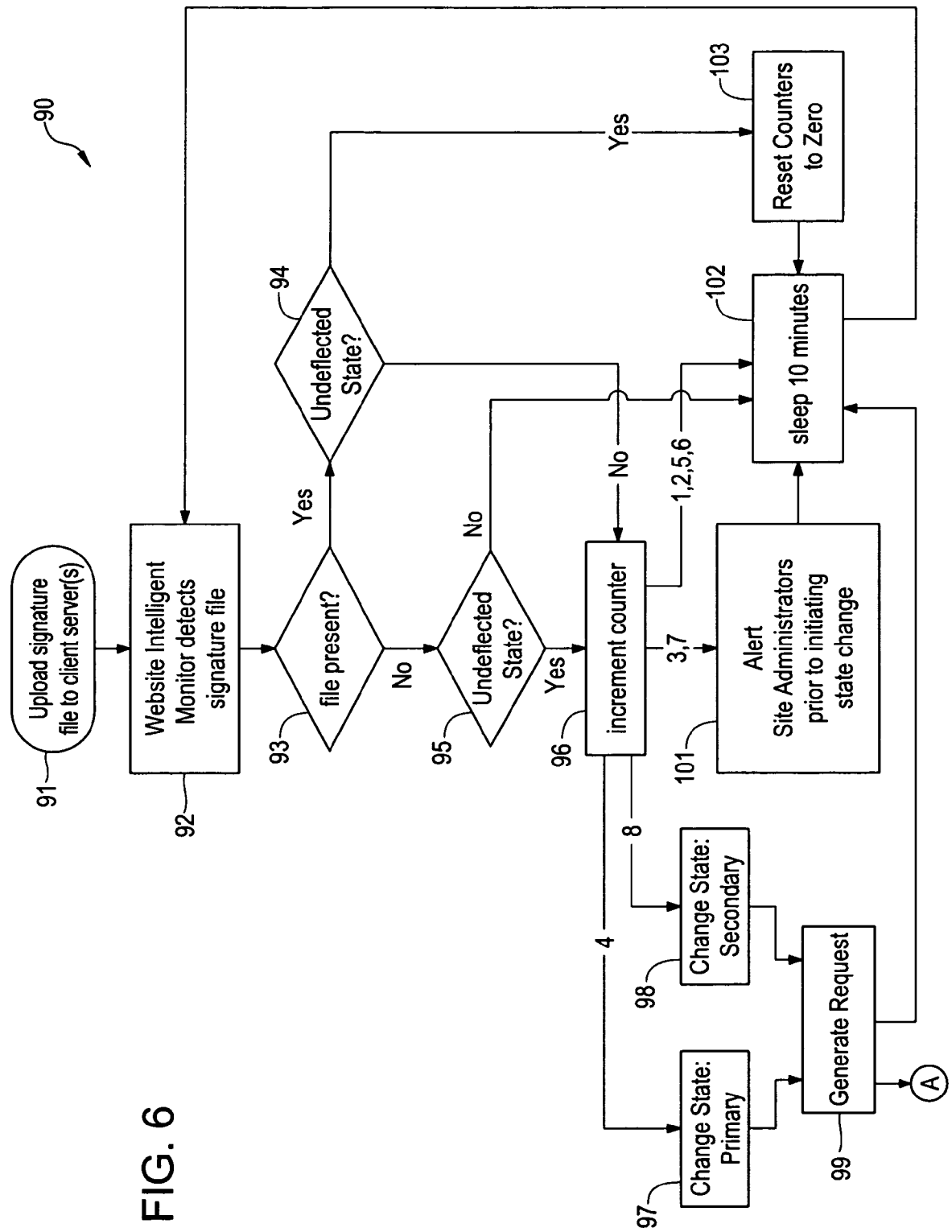

A further innovation is provided in the herein described system through the use of an intelligent website monitor 34 (see FIG. 2). The entity website server is interrogated periodically in an intelligent manner to determine its operational state in the event that the web server becomes disrupted, as defined in association with known parameters, and the deflection process may be initiated by the intelligent monitor 34. The processing steps pursuant to the intelligent monitor 34 are shown in FIG. 6.

As shown, prior to initiation of the intelligent monitor process 90, a signature file is uploaded 91 to entity web server 15 at a known directory location. The intelligent monitor then attempts to detect the existence of the signature file 92 on the entity web server 15 (see FIG. 2). If the presence of the file is verified 93, the intelligent monitor determines from the existing database on the administration DNS server 21 whether or not that site is supposed to currently be in an undeflected state 94. If the entity web server site is in an undeflected state then counters associated with the process 90 in FIG. 6 are reset to zero 103 and process 90 sleeps for 10 minutes. If the site is in a deflected state then counter 96 is incremented by 1 and the process 90 sleeps for 10 minutes 102. In the event that the file is not present 93 then the state of the entity web server is again determined 95 and if its in an undeflected state then the counter is incremented 96. If it is not in an undeflected state then the intelligent monitor initiates a sleep cycle for ten minutes 102. As shown in the diagram, incrementing the counter 96 results in additional initiated actions depending upon the current counter state. For example, counter values 1, 2, 5, 6, all initiate sleep cycles 102. Conversely, counter values 3 and 7 alert 101 site administrators prior to initiating a state change and sleep for ten minutes 102. A counter value of 4 results in a state change to a primary state for a deflected web server 97 and generates a deflection request 99. The counter value of 8 initiates a state change to a secondary deflection state 98 and generates a corresponding deflection request 99. As it may be seen, the intelligent monitor generally sleeps for specified periods of time, in this case ten minutes, during different portions of the monitoring process so that graduated and intelligent decisions may be made regarding the true status of the entity web server 15 and respond accordingly.

While I have shown my invention in one form, it will be obvious to those skilled in the art that it is not so limited but is susceptible of various changes and modifications without departing from the spirit thereof.

Having set forth the nature of the invention, what is claimed is:

1. A system for deflecting a website upon receiving a deflection request in response to an emergency event, comprising:

a. a first webserver for delivering a first html page;

b. a second webserver configured to deliver a second html page, said second html page including information related to said emergency event;

c. an administration computer server having a DNS zone file, said zone file including an A record pointing to the IP address of said first webserver;

d. an entity DNS computer server having a DNS zone file, said entity zone file including a CNAME record pointing to said A record on said administration server; and, e. means running on said administration computer server for automatically altering said A record in said administration zone file such that said A record points to the IP address for said second webserver.

2. A system as recited in claim 1, wherein said automatic altering means includes:

a. means for locating said administration zone file;

b. means for reading said administration zone file into a memory array;

c. means for parsing said administration zone file and locating said A record;

d. means for updating said A record to point to said second webserver;

e. means for updating the serial number of said administration zone file;

f. means for writing and reloading said administration zone file on said administration server; and, g. means for propagating said altered administration zone file to any existent slave servers.

3. A system as recited in claim 2, wherein said administration computer includes means for initiating and validating said deflection request, comprising:

a. means for writing a drop-off file into a predefined directory on said administration server;

b. database means for writing deflection data into said drop-off file corresponding to the identity of said deflection requester and information about the webserver to which deflection is to occur; and, c. means for validating the content of said drop-off file and initiating a deflection processing request.

4. A system as recited in claim 3, wherein said administration computer includes means for monitoring said first webserver and initiating said altering means upon the in-operation of said first webserver.

5. A system as recited in claim 1, wherein said administration computer includes means for generating an html form page, said form page including means for posting deflection request data on said administration server.

6. A system as recited in claim 5, wherein said administration computer includes means for initiating and validating said deflection request data, and wherein said initiating and validating means comprises:

a. means for writing a drop-off file into a predefined directory on said administration server;

b. database means for writing deflection data into said drop-off file corresponding to the identity of said deflection requestor and information about the webserver to which deflection is to occur; and, c. means for validating the content of said drop-off file and initiating a deflection processing request.

7. A system as recited in claim 1, wherein said administration computer includes means for monitoring said first webserver and initiating said altering means upon the in-operation of said first webserver.

8. A system as recited in claim 7, wherein said monitoring means comprises:

a. means for determining the presence of a pre-configured file on said first webserver;

b. responsive to said file existence means, means for determining the deflection state of said webserver;

c. means responsive to said deflection state means for incrementing a counter, whereby the numeric value of said counter determines whether a deflection request is generated by said monitoring means; and, d. means responsive to said counter means and said deflection state means for putting said monitoring means into a sleep mode for a predetermined amount of time.

9. A method for deflecting requests for an entity's website to an alternate website in the event of an emergency event affecting the operation of said entity's website, comprising the steps of:

a. receiving a deflection request on a third party DNS administration server;

b. validating the request;

c. retrieving pre-stored information correlating the deflection request to stored deflection state settings;

d. altering a zone file present on said administration DNS server to re-associate an A record IP address to the address of said alternate website; and, e. verifying that the alteration to said zone file has been successfully propagated to all servers within the authority of said administration DNS server.

10. The method of claim 9, wherein said step of altering said zone file comprises the steps of:

a. locating said zone file;

b. reading said zone file into a memory array;

c. parsing said zone file and locating said A record;

d. changing the IP address associated with said A record to point to said second webserver;

e. changing the serial number of said zone file;

f. writing and re-loading said zone file onto said administration server; and, g. propagating said altered zone file to any existent slave servers.

11. The method of claim 10, further comprising the step of monitoring the operation of said first webserver and generating a deflection request to said DNS administration server upon the first webserver becoming unavailable to access.

12. The method of claim 11, wherein said step of monitoring said first webserver comprises the steps of:

a. determining the presence of a pre-configured file on said first webserver;

b. responsive to the existence of said file, determining the deflection state of said webserver;

c. responsive to said deflection state, incrementing a counter;

d. generating a deflection request in response to said counter holding a pre-determined value; and, e. said monitoring process entering into a sleep mode for a predetermined amount of time, whereby said step of entering into a sleep mode results from said step of determining the state of said webserver or the numeric value of said counter.

13. The method of claim 12 wherein said step of receiving a deflection request comprises writing a file into a predefined directory on said administration server, wherein said step of writing said file includes writing data into said file corresponding to deflection data held by a database running on said administration server.

14. The method of claim 13, wherein said step of receiving a deflection request further comprises the step of presenting a form html page to a requester and said requester selecting a deflection option on said html page causing the post-back of data onto said administration server.

15. The method of claim 14 wherein said step of validating said deflection request comprises comparing the data present in said file stored in said predefined directory with data stored in a database running on said administration server to confirm an authentic deflection request.

16. The method of claim 9, further comprising the step of monitoring the operation of said first webserver and generating a deflection request to said DNS administration server upon the first web server becoming unavailable.

17. The method of claim 16, wherein said step of monitoring said first webserver comprises the steps of:
 a. determining the presence of a pre-configured file on said first webserver;
 b. responsive to the existence of said file, determining the deflection state of said webserver;
 c. responsive to said deflection state, incrementing a counter;
 d. generating a deflection request in response to said counter holding a pre-determined value; and,
 e. said monitoring process entering into a sleep mode for a predetermined amount of time, whereby said step of entering into a sleep mode results from said step of determining the state of said webserver or the numeric value of said counter.

18. The method of claim 9, wherein said step of receiving a deflection request further comprises the step of presenting a form html page to a requester and said requester selecting a deflection option on said html page causing the post-back of data onto said administration server.

19. A method for altering the configuration of an entity's webserver topology to allow immediate deflection of the entity's website to a second website in the event of an emergency, comprising the steps of:
 a. interposing a third party administration DNS server between said entity DNS server and said entity webserver by altering a DNS zone file on an entity DNS server to include a CNAME record pointing to an A name record on said administration DNS server pointing to the IP address of said entity webserver;
 b. creating an externally accessible html form page on said administration DNS server, said html form page configured to post-back deflection request data to said administration DNS server upon the selection of a deflection request on said form page;
 c. creating a database resident on said administration DNS server that holds deflection request data and IP addressing information on said second webserver; and,
 d. running a computer program that periodically looks for receipt of said post-back deflection request data and initiates an update to said administration DNS server zone file that alters the IP address of said A record to point to said second webserver.

20. The method of claim 19, wherein said step of updating said administration zone file comprises the steps of:
 a. locating said zone file;
 b. reading said zone file into a memory array;
 c. parsing said zone file and locating said A record;
 d. changing the IP address associated with said A record to point to said second webserver;
 e. changing the serial number of said zone file;
 f. writing and re-loading said zone file onto said administration server; and,
 g. propagating said altered zone file to any existent slave servers.

21. The method of claim 20, further comprising the step of running a program on said administration server to monitor the operation of said first webserver and generate a deflection request to said DNS administration server upon the first webserver becoming unavailable.

22. The method of claim 21, wherein said step of running a program on said administration server to monitor the operation of said entity webserver comprises the steps of:
 a. determining the presence of a pre-configured file on said entity webserver;
 b. responsive to the existence of said file, determining the deflection state of said entity webserver;
 c. responsive to said deflection state, incrementing a counter;
 d. generating a deflection request in response to said counter holding a pre-determined value; and,
 e. said monitoring process entering into a sleep mode for a predetermined amount of time, whereby said step of entering into a sleep mode results from said step of determining the state of said entity webserver or the numeric value of said counter.

23. The method of claim 19, wherein said database includes multiple webserver states to allow multiple deflections to successive websites in accordance with the status of an emergency event.

24. The method of claim 19, wherein said html form page is configured to present multiple deflection choices.

25. The method of claim 19, further including the step of running a program after said step of updating said administration DNS server zone file to check for the successful change of state of said entity webserver and issuing a alert in the event of a failed update.

\* \* \* \* \*